United States Patent [19]

Frank

[11] Patent Number: 4,912,354

[45] Date of Patent: Mar. 27, 1990

[54] ROTOR RETAINING RING SYSTEM

[75] Inventor: Joseph J. Frank, Esperance, N.Y.

[73] Assignee: General Electric Company, Schenectady, N.Y.

[21] Appl. No.: 292,867

[22] Filed: Jan. 3, 1989

[51] Int. Cl.$^4$ .............................................. H02K 3/48
[52] U.S. Cl. ...................................... 310/271; 310/270
[58] Field of Search ........................... 310/260, 270, 271

[56] References Cited

U.S. PATENT DOCUMENTS

| | | | |
|---|---|---|---|
| 3,935,794 | 2/1976 | Rumsey | 91/488 |
| 4,413,649 | 11/1983 | Rodd et al. | 157/505.39 |
| 4,469,002 | 9/1984 | Thayer | 84/390 |
| 4,486,676 | 12/1984 | Moore et al. | 310/52 |
| 4,490,622 | 12/1984 | Osborn | 290/52 |
| 4,535,373 | 8/1985 | Schuh | 360/97 |
| 4,654,550 | 3/1987 | Lowther et al. | 310/59 |
| 4,730,471 | 3/1988 | Seckinger et al. | 70/277 |
| 4,742,722 | 5/1988 | Wallace | 74/64 |

Primary Examiner—Patrick R. Salce
Assistant Examiner—Judson H. Jones
Attorney, Agent, or Firm—Nixon & Vanderhye

[57] ABSTRACT

A retaining ring system for a rotating electrical device such as a generator, motor, or condenser, including an auxiliary ring adapted to be removably mounted around the end portion of the rotor of the rotating electrical device bridging the rotor winding slots, and a retaining ring removably mounted around the first ring. The retaining ring supports the amortisseur and the field end windings of the rotating electrical device. An external first taper defined by the auxiliary ring and an internal second taper defined by the retaining ring provide mating, continuous first and second tapered surfaces. The assembly process is begun by sliding or jacking the auxiliary ring onto the rotor. A high pressure feed fluid line defined in the auxiliary ring includes an inlet port and an outlet port opening at a circumferential groove between the mating first and second tapered surfaces between O-ring seals. For either assembly or disassembly, a high pressure fluid is sent between the first and second tapered surfaces sufficient to decrease the diametrical dimension of the first tapered surface of the auxiliary ring and to increase the diametrical dimensions of the second tapered surface of the retaining ring and thus to separate the auxiliary ring from the retaining ring devoid of the application of heat and also thus to allow either the mounting of the retaining ring to the auxiliary ring devoid of the application of heat or the disassembly of the retaining ring from the rotor devoid of the application of heat.

20 Claims, 8 Drawing Sheets

ROTOR RETAINING RING SYSTEM

FIELD OF THE INVENTION

This invention relates generally to retaining rings and specifically to retaining rings which support the end windings of the rotors of rotating electrical devices such as generators, motors, and condensers.

BACKGROUND OF THE INVENTION

The field end windings of a generator, motor, condenser, or other rotating electrical device are supported by a retaining ring fitted over the rotor. The inner diameter of the retaining ring is less than the outer diameter of the rotor in the range of 40 to 50 mils. The assembly is accomplished by sliding the retaining ring over the rotor by heating the retaining ring for a shrink fit with the rotor. Heat shrinking the retaining ring to the rotor can damage the insulation of the field end windings or the retaining ring itself or both. A centering ring is then fitted into a central bore of the retaining ring. The retaining ring and the rotor cannot be keyed to one another because of the retaining ring's inability to withstand the stresses encountered.

When a rotating electrical device is disassembled for maintenance or repair, the retaining ring must be heated in order to remove it from the rotor. Because of the required heavy shrink fit of the retaining ring to the rotor, it is difficult and costly to supply the heat necessary for disassembly. The insulation of the windings can be damaged during this process. With excessive heat, the retaining ring itself may be damaged. In the prior art, when a retaining ring is partially damaged because of stress corrosion, a cylindrical intermediate spacer ring has been inserted between the salvaged retaining ring and the rotor. But due to fit-up problems associated with the retaining ring, the cylindrical intermediate spacer ring, and the rotor, the retaining ring is completely replaced with a new retaining ring instead of being salvaged. Also, due to tolerance variance of the rotor, retaining rings are usually customized. Also, because of the necessity of applying heat to retaining rings for both assembly and disassembly, repairs to rotating electrical devices at remote locations, such as ships at sea for example, are especially difficult to perform.

Hubs that are not provided with a keyway receive torque from the shaft through friction, so that the hubs must grip the shaft tightly. This gripping can be accomplished by advancing a tapered hub onto a tapered shaft a specified distance. Advancement by conventional mechanical means requires bracing the shaft, which, because of the great axially directed force needed to force on the hub, can cause damage to or buckling of the shaft. In order to avoid bracing the shaft, the advance of the hub onto the shaft can be facilitated by expansion of the bore of the hub. Two methods are used most often: heating or hydraulic pressure. Drive coupling manufacturers have developed procedures for both mounting and dismounting tapered hubs onto and from tapered shafts by hydraulic means devoid of the application of heat. During either the mounting or dismounting procedure, oil under high pressure is pumped between the shaft and the hub through a high pressure feed oil line located in either the hub or the shaft to a shallow circular groove machined in either in the hub or in the shaft. O-rings are installed on both sides of the groove to trap the oil during the pressurizing procedure. A high pressure oil pump is connected to an inlet hole for the feed oil line provided in either the center of the shaft or the outside diameter of the hub. By a combination of an installation tool and the application of the high pressure oil so as to expand the bore of the hub, either the assembly or the disassembly of a retaining ring to or from a rotor can thus be accomplished by mechanical means devoid of application of heat to the hub.

The above described methods of assembly and disassembly cannot be applied to assembling or disassembling a retaining ring to or from a rotating electrical device rotor not only because of the difficulty of tapering the rotor but primarily because the winding slots of the rotor are open at the circumferential surface of the rotor with the result that the pressurized oil would enter the winding slots.

SUMMARY OF THE INVENTION

It is therefore an object of the present invention to provide a retaining ring system for the rotor of a rotating electrical device which can be assembled devoid of the application of heat, thus precluding damaging surrounding insulation or the ring itself.

It is another object of the present invention to provide a retaining ring system for the rotor of a rotating electrical device which can be disassembled by means devoid of the application of heat, thus precluding damaging surrounding insulation of the ring itself.

It is yet another object of the present invention to provide a retaining ring system for the rotor of a rotating electrical device which can be assembled and disassembled by means devoid of the application of heat and thus to accomplish the assembly and disassembly in a time significantly faster than by the application of heat.

It is yet another object of the present invention to provide a retaining ring system for the rotor of a rotating electrical device which includes an auxiliary ring positioned next to the rotor and a retaining ring mounted over the auxiliary ring so that the retaining ring can be interchangeably stocked to fit over auxiliary rings that are manufactured to particular requirements.

It is yet another object of the present invention to provide a retaining ring system for the rotor of a rotating electrical device which includes an auxiliary ring positioned next to the rotor and a retaining ring mounted over the auxiliary ring so that prior art retaining rings in use that are partially cracked at their inner diameters can be salvaged by machining away the damaged areas and providing auxiliary rings having outer diameters adapted to mate with the dimensions of the salvaged machined retaining rings.

It is yet another object of the present invention to provide retaining ring assembly and disassembly systems for the rotor of a rotating electrical device which can be accomplished devoid of the application of heat.

In accordance with the above objects and other objects which will become apparent hereinafter, there is provided a retaining ring system for a generator, motor, condenser, or rotating electrical devices in general which includes an auxiliary ring adapted to be removably mounted around the end portion of the rotor of the rotating electrical device bridging the rotor winding slots, and a retaining ring removably mounted around the first ring. The retaining ring supports the amortisseur and the field end windings of the rotating electrical device. An external first taper defined by the auxiliary ring and an internal second taper defined by the retaining ring provide mating, continuous first and second tapered surfaces. The assembly process is begun by sliding or forcing the auxiliary ring onto the rotor. A high pressure feed fluid line defined in the auxiliary ring includes an inlet port and an outlet port which opens at a circumferential groove between the mating first and second tapered surfaces between O-ring seals. For either assembly or disassembly, a source of high pressure fluid is connected to the inlet port of the feed fluid line and a high pressure fluid is sent between the first and second tapered surfaces sufficient to decrease the diametrical dimension of the first tapered surface of the auxiliary ring and to increase the diametrical dimensions of the second tapered surface of the retaining ring and thus to separate the auxiliary ring from the retaining ring devoid of the application of heat and also thus to allow either the mounting of the retaining ring to the auxiliary ring devoid of the application of heat or the disassembly of the retaining ring from the rotor devoid of the application of heat. Application of mechanical force to the retaining ring is combined with the application of high pressure oil during the assembly or disassembly process.

A large-size retaining ring that is partially cracked can be salvaged by replacing the damaged portion by the auxiliary ring, thus salvaging the large-size retaining ring with variably toleranced auxiliary rings. The auxiliary ring may be made of a less costly material than the retaining ring, such as steel or a bronze alloy.

Interchangeable stocking of the large-size retaining rings is accomplished by being able to vary the cylindrical inner diameters of the auxiliary rings. The mating tapers of the auxiliary and retaining rings are forgiving of tolerances.

The present invention will be better understood and objects and important features, other than those specifically set forth above, will become apparent when consideration is given to the following details and description, which when taken in conjunction with the annexed drawings, describes, discloses, illustrates, and shows preferred embodiments or modifications of the present invention and what is presently considered and believed to be the best mode of practice in the principles thereof. Other embodiments or modifications may be suggested to those having the benefit of the teachings therein, and such other embodiments or modifications are intended to be reserved especially as they fall within the scope and spirit of the subjoined claims.

DESCRIPTION OF THE PREFERRED EMBODIMENT

Reference is now made in detail to the drawings of an embodiment of the invention wherein the same numerals refer to the same or similar elements.

Figure 1:
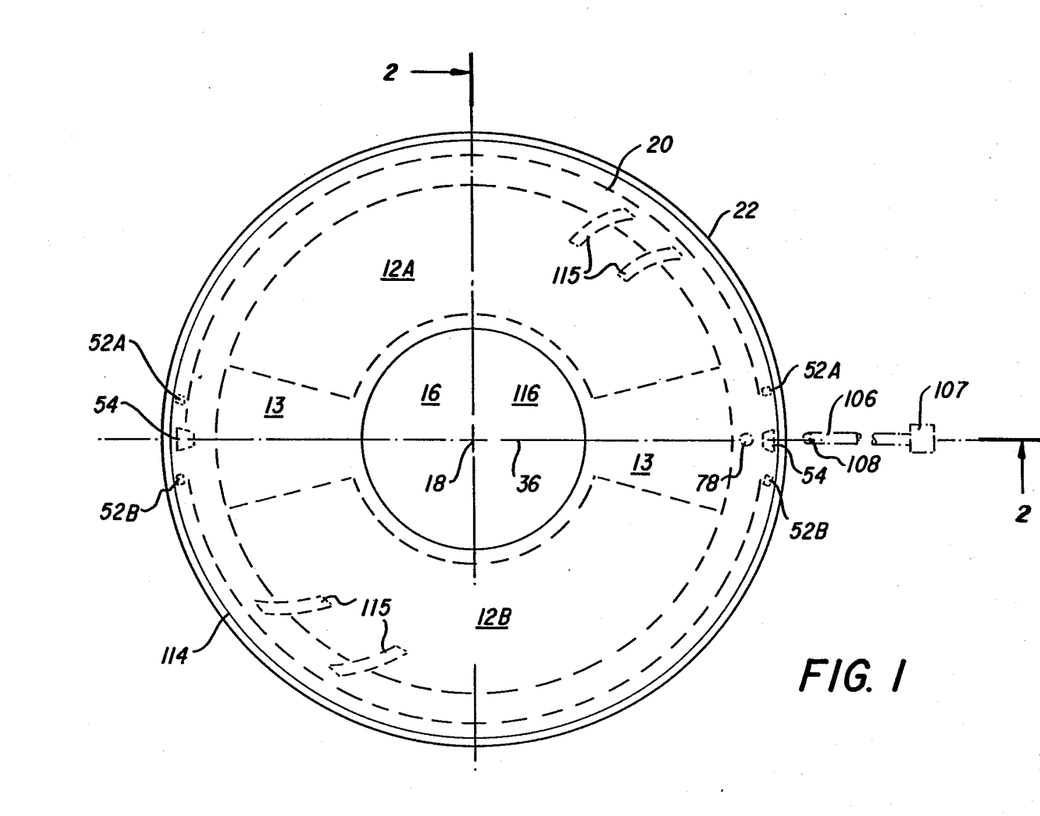
FIG. 1 is a front view of a generator rotor including a retaining ring system.
Figure 2:
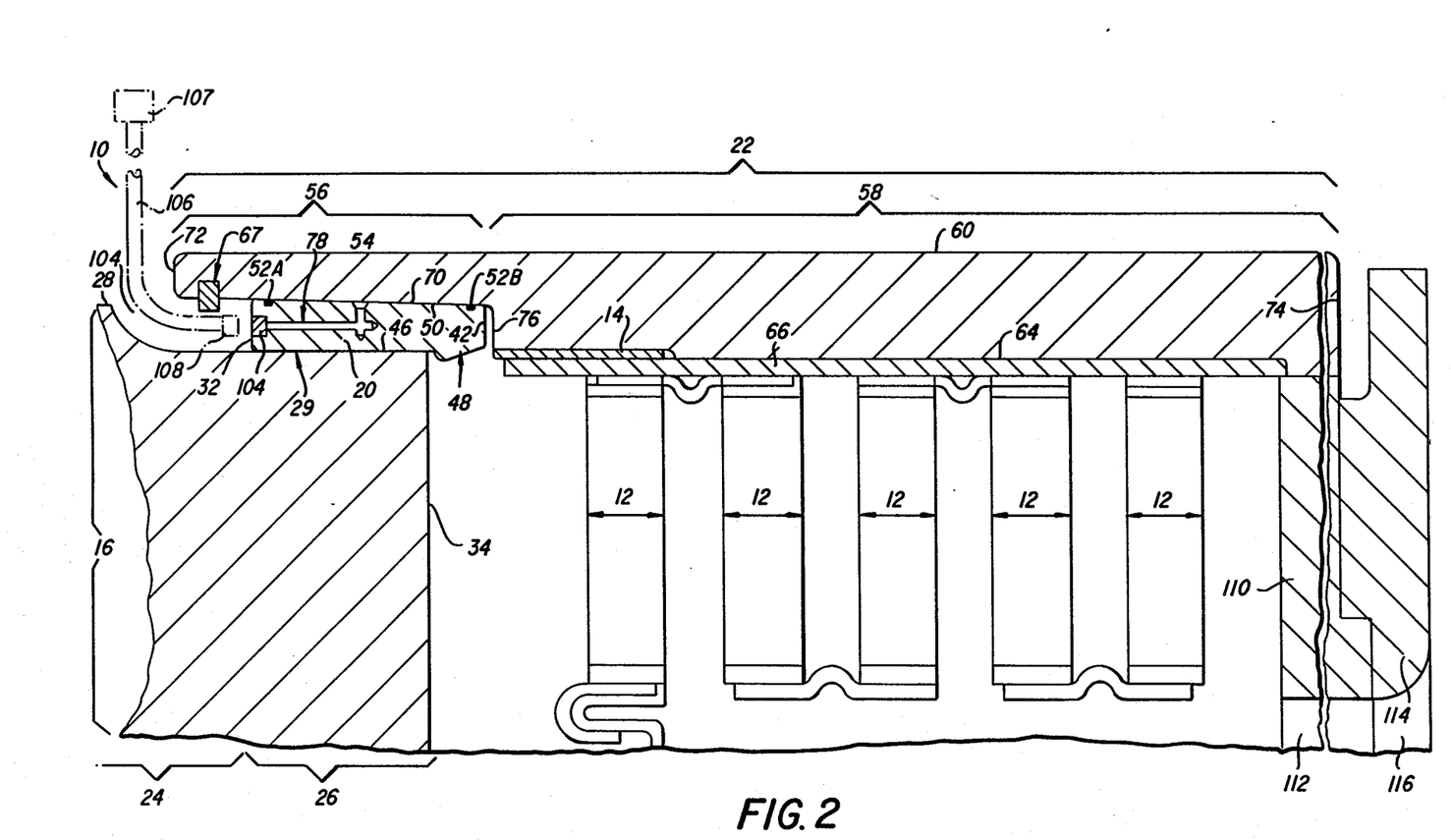
FIG. 2 is a sectional view taken through line 2—2 of FIG. 1 showing the outer end portion of the generator rotor and the retaining ring system.
Figure 3:
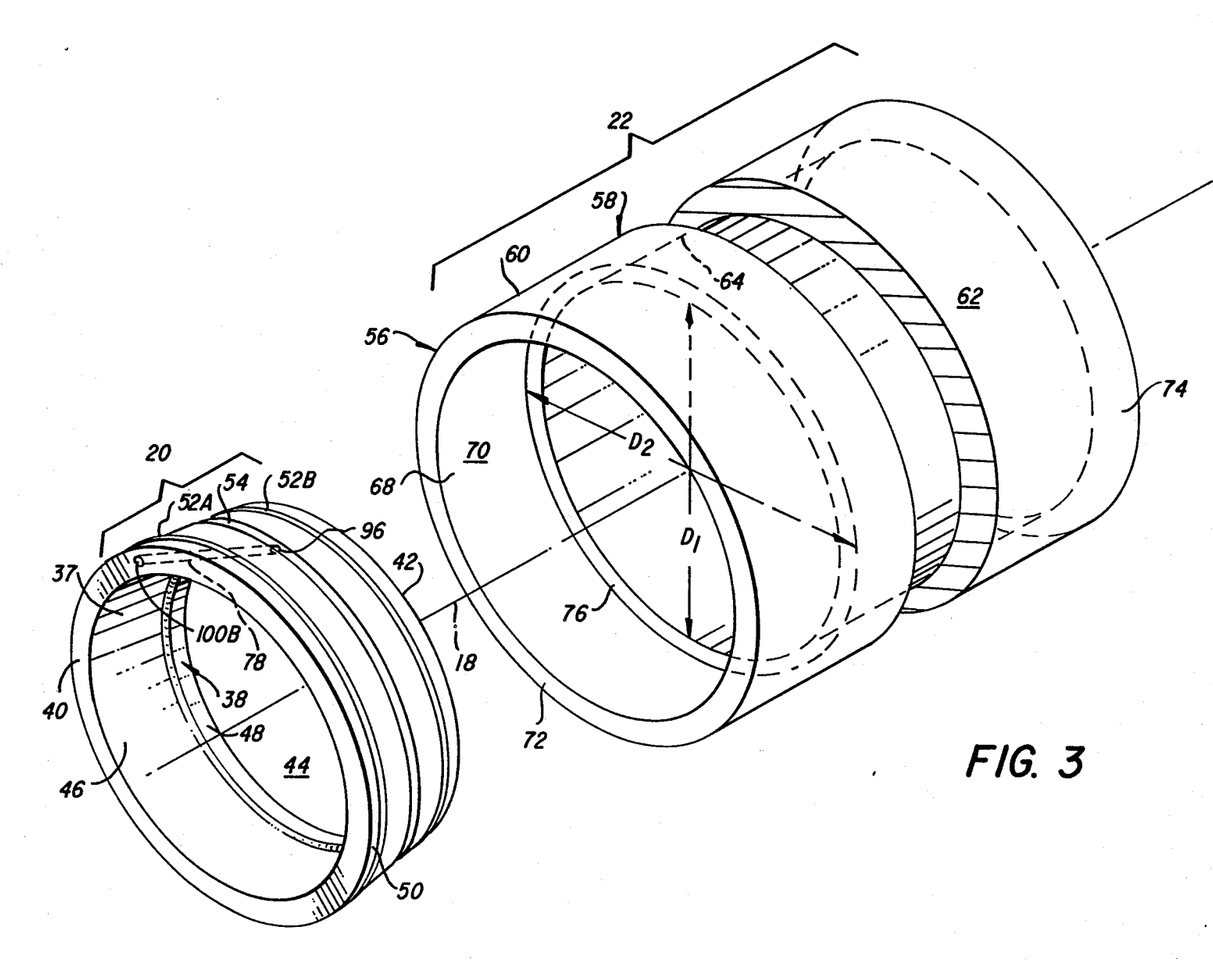
FIG. 3 is a simplified, exploded perspective view of the auxiliary and retaining rings of the present invention.

A retaining ring system 10 illustrated in FIGS. 1–4 supports the opposed sets of the field end windings 12A and 12B shown in FIG. 1 in upper and lower positions, respectively, separated by diametrically opposed spaces 13 between field end windings 12A and 12B and the amortisseur winding 14 of a generator. Retaining ring system 10 is adapted to be mounted to the outer end portion of the shaft, or rotor, 16 of the generator. It is noted that a generator rotor has two opposed outer end portions to which retaining ring system 10 would be mounted, one of which is illustrated. Rotor 16 has an axis of rotation 18. Retaining ring system 10 includes an auxiliary ring 20 directly mounted to the outer end portion of rotor 16 and a retaining ring 22 mounted around auxiliary ring 20, which in turn supports retaining ring 22. Auxiliary ring 20 and retaining ring 22 are each in axial alignment with rotor axis of rotation 18. Auxiliary ring 20 is the inner ring and retaining ring 22 is the outer ring relative to rotor axis of rotation 18. Both field end windings 12A and 12B and amortisseur windings 14 are directly supported by retaining ring 22. Auxiliary ring 20 and retaining ring 22 are axially aligned with rotor axis of rotation 18.

Rotor 16 includes a rotor main portion 24 and an integral rotor end portion 26 with rotor main portion 24 being connected to the rotor driver (not shown). Rotor main portion 24 has a cylindrical outer wall 28 having an outer diameter and rotor end portion 26 has a cylindrical outer wall 29 having an outer diameter less than the diameter of cylindrical outer wall 28. A number of equally spaced rotor winding slots defined by rotor 16 are longitudinally located opening at cylindrical outer wall 29 of rotor end portion 26 and continue longitudinally inwardly into rotor main portion 24. Field windings 31 are positioned in rotor winding slots 30. Rotor 16 forms a ring shaped, radially aligned shoulder wall 32 between rotor main portion 24 and rotor end portion 26. Rotor 16 has a circular rotor end wall 34 transverse to rotor axis of rotation 18. Rotor main portion 24 defines a slot 35 opening at cylindrical outer wall 29 and at shoulder wall 32. Slot 35 is located at the rotor centerline 36 which bisects the pole faces of field end windings 12A and 12B, center line 36 being illustrated at the horizontal position.

Auxiliary ring 20 has opposed inward and outward portions 37 and 38, respectively, having inward and outward end walls 40 and 42, respectively, the inward and outward designations being relative to rotor 16 and rotor axis of rotation 18 in the lengthwise, or longitudinal, dimension. Inward end wall 40 is positioned in contact with shoulder wall 32, and outward portion 38 extends a short distance beyond rotor end wall 34. Auxiliary ring 20 forms a cylindrical hole 44 axially aligned with rotor axis of revolution 18 and defined by inward and outward portions 37 and 38, in particular defined by a cylindrical inner wall 46 of inward portion 37 and by a generally circular inner wall 48 of outward portion 38. Cylindrical inner wall 46 is in a light press-fit engagement with cylindrical outer wall 29 of rotor end portion 26.

Figure 5:
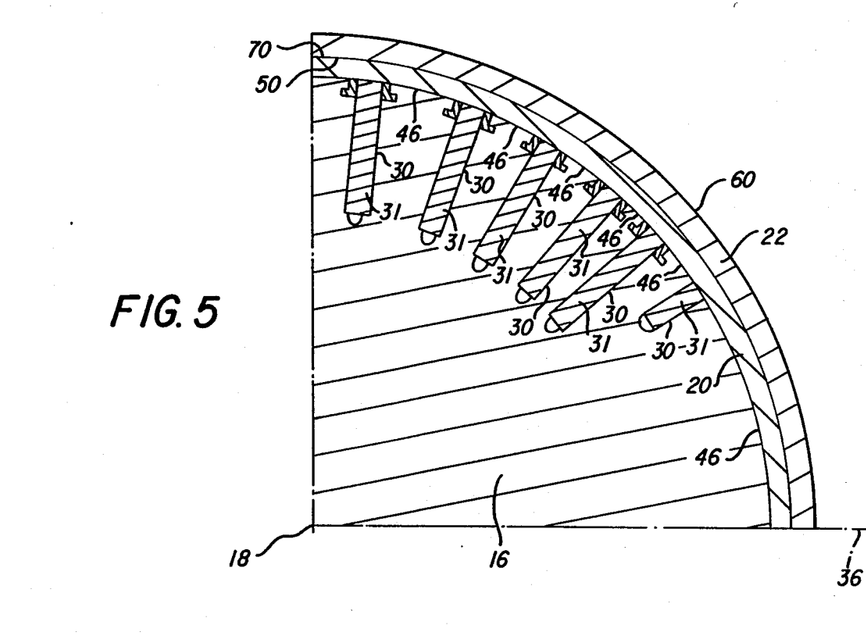
FIG. 5 is a sectional view taken through line 5—5 of FIG. 4.

In particular, as best seen in FIG. 5, cylindrical inner wall 46 bridges rotor winding slots 30 and field windings 31. Cylindrical outer wall 29 of rotor 16 is intermittently interrupted by rotor winding slots 30 and so comprises the longitudinal surfaces between rotor winding slots 30 with cylindrical inner wall 46 being in press-fit engagement with such longitudinal surfaces.

Auxiliary ring 20 has a tapered outer wall 50 equidistant from rotor axis of rotation 18 decreasing in diameter relative to rotor axis of rotation 18 between inward portion 37 toward outward portion 38. A pair of spaced inward and outward O-ring seals 52A and 52B, respectively, extend around tapered outer wall 50 in planes perpendicular to rotor axis of rotation 18. A circumferential shallow groove 54 formed by auxiliary ring 20 extends around tapered outer wall 50 between O-ring seals 52A and 52B at an equal distance from each seal in a plane perpendicular to rotor axis of rotation 18.

Retaining ring 22 is axially aligned with rotor axis of rotation 18 and has inward and outward retaining ring sections 56 and 58, respectively, the inward and outward designations being relative to rotor 16 in the longitudinal dimension. Retaining ring 22 has a cylindrical outer wall 60. Outward retaining ring section 58 forms a cylindrical hole 62 having an inner diameter $D_1$ (FIG. 3) and having an outward circular aperture. Hole 62 is in particular defined by a cylindrical inner wall 64 around which is mounted a field end winding insulation 66 and field end windings 12A and 12B, which are schematically shown, in a manner known in the art. Amortisseur windings 14 are mounted in a plurality of slots formed around cylindrical inner wall 64 in a manner known in the art. A snapring 67 is positioned over rotor 16 at cylindrical outer wall 28 near end wall 72 in order to preclude axial migration of rotor ring 22 due to differential thermal expansion of field windings 31.

Inward retaining ring section 56 forms a tapered hole 68 defined by a tapered inner wall 70. Retaining ring 22 includes inward and outward end walls 72 and 74, respectively, the inward and outward designations being relative to rotor 16 particularly rotor end wall 34 in the longitudinal dimension of rotor axis of revolution 18. The inner diameter of tapered inner wall 70 at its outer end adjacent to outward retaining ring section 58 has a diameter $D_2$ (FIG. 3) that is greater than inward diameter $D_1$ so that retaining ring 22 forms a circular wall 76 transverse to and extending around rotor axis of rotation 18 at the area of juncture inward and outward retraining ring sections 56 and 58. The taper of tapered inner wall 70 decreases in diameter relative to rotor axis of rotation 18 between inward end wall 72 and circular wall 76.

The taper of tapered inner wall 70 is the same as the taper of tapered outer wall 50 so that tapered inner and outer walls 70 and 50 mate with one another. Tapered inner and outer walls 70 and 50 are either in mutual, continuous press-fit engagement or in mutual, continuous heat-shrunk engagement. Circumferential groove 54 is for providing access to introduction of oil under pressure to continuous tapered walls 50 and 70 as will be described herein later.

. Circular wall 76 of retaining ring 22 is slightly spaced from outward end wall 42 of auxiliary ring 20 to ensure sufficient space for full press-fit engagement of cylindrical inner wall 46 of auxiliary ring 20 with cylindrical outer wall 29 of rotor 16 during the assembly process.

Figure 4:
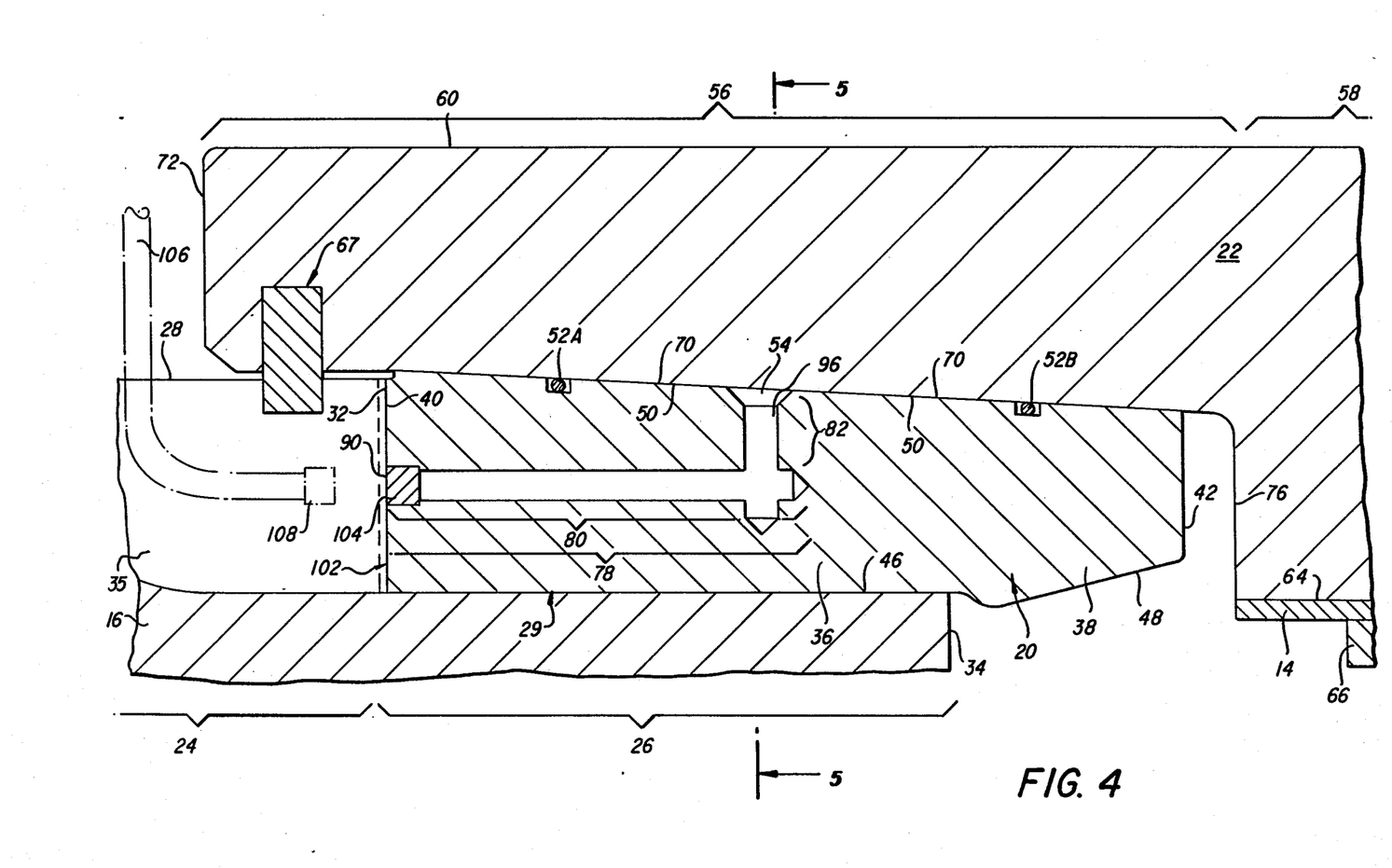
FIG. 4 is an isolated, enlarged view of the sectional view of the retaining ring system as shown in FIG. 2.

Retaining ring system 10 includes a high pressure feed oil line 78 located in auxiliary ring 20. High pressure feed oil line 78 is formed by a longitudinal feed line passage 80 tapped through auxiliary ring 20 lateral to rotor axis of rotation 18 and a connecting feed line portion 82 tapped through auxiliary ring 20 aligned transverse to rotor axis of rotation 18. High pressure feed oil line 78 has an inlet port 90 located at cylindrical outer wall 28 of rotor main portion 24 opening at slot 35 and an outlet port 96 opening at groove 54. Both inlet and outlet ports 90 and 96 are aligned with horizontal centerline 36. Feed oil line portions 80 and 82 form a continuous tubular passage between inlet and outlet ports 90 and 96. Auxiliary ring 20 has a radially aligned key component and rotor 16 defines a radially aligned keyway component at shoulder wall 32, the key/keyway components together comprising a keeper 102 for aligning auxiliary ring 20 with rotor 16 so as to align inlet port 90 and slot 35 during assembly. Keeper 102 can be located at a plurality of radially aligned positions and is positioned as illustrated in FIG. 4 for purposes of exposition. A removable sealing plug 104 is screwed into a screw fitting at the end of high pressure feed oil line 78 at inlet port 90. An external high pressure feed oil line 106 adapted to be connected to transverse line portion 82 upon removal of plug 104 at one end and to a source of high pressure oil 107 at the other end is shown in part in phantom line. When plug 104 is removed from inlet port 90, external high pressure feed oil line 106 having a screw-in connector 108 can then be screwed into auxiliary ring 20 at inlet port 90.

Figure 7:
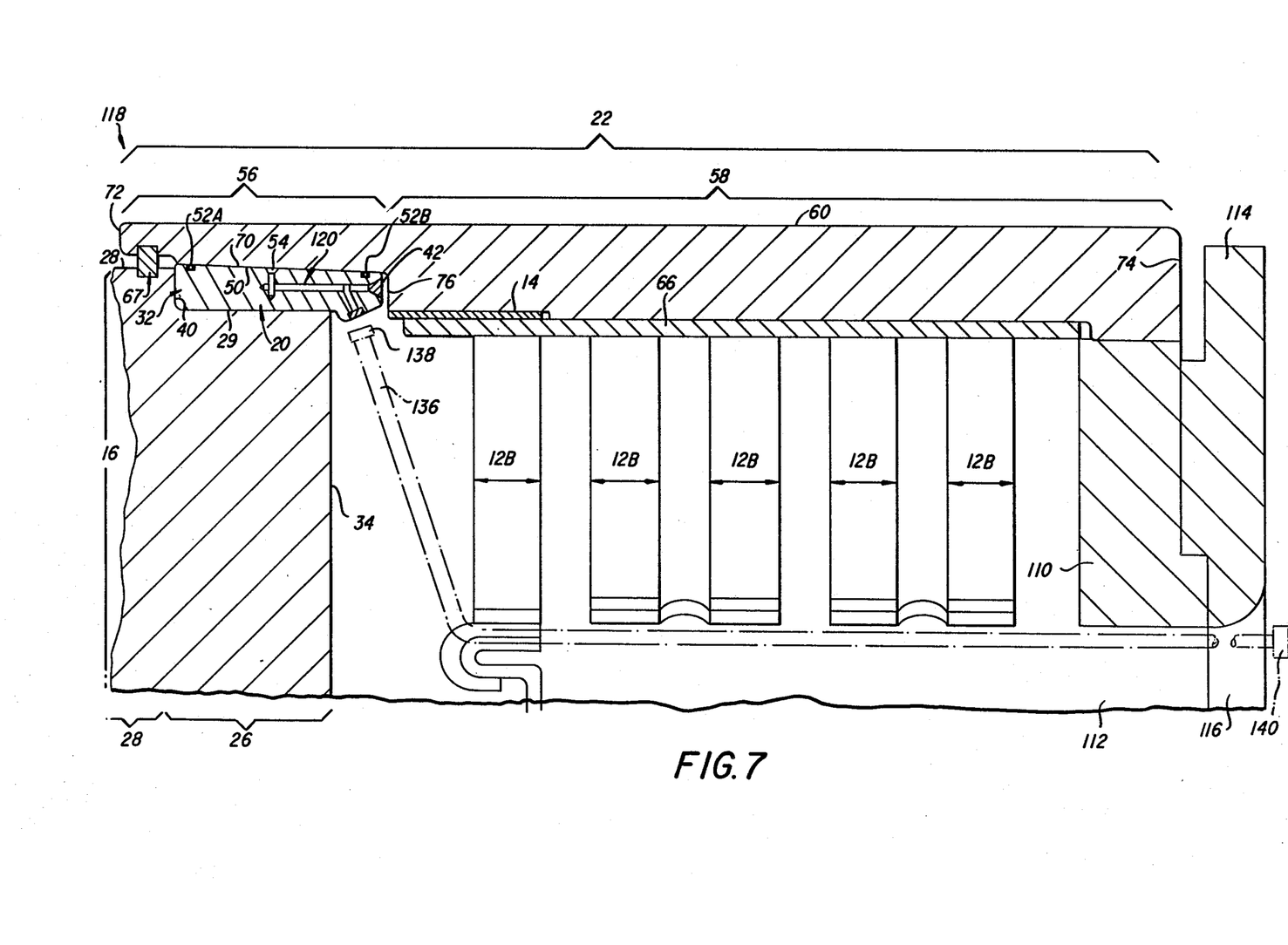
FIG. 7 is a sectional view taken through line 7—7 of FIG. 6; an FIG. 8 is an isolated, enlarged sectional view of the retaining ring system illustrated in FIG. 7.

A centering ring 110 is positioned at outward end wall 74 of retaining ring 22 within hole 62. Centering ring 110 has a cylindrical hole 112 (FIG. 7). A cylindrical fan 114 with fan blades 115 attached to centering ring 110 by means known in the art also has a cylindrical hole 116 axially aligned with hole 112.

The assembly of retaining ring system 10 to rotor 16 is accomplished in accordance with the following steps:

(a) rotating auxiliary ring 20 until a key and keyway associated with shoulder wall 32 and inward end wall 40 of auxiliary ring 20 are in alignment so that inlet port 90 of internal high pressure feed oil line 78 in auxiliary ring 20 is in alignment with slot 35 defined at cylindrical outer wall 28 of rotor 16;

(b) positioning cylindrical inner wall 46 of auxiliary ring 20 over cylindrical outer wall 29 of rotor end portion 26, bridging rotor winding slots 30 until the key and keyway are locked into alignment as alignment keeper 102 with inward end wall 40 of auxiliary ring 20 being in contact with shoulder wall 32; if cylindrical inner wall 46 has a slightly greater diameter than cylindrical outer wall 29, the positioning is accomplished by sliding auxiliary ring 20 onto rotor 16; if cylindrical inner wall 46 has a slightly smaller diameter than cylindrical outer wall 29, the positioning is accomplished by the application of longitudinal force, such as by jacking;

(c) applying oil to the interfacing surfaces of tapered outer wall 50 of auxiliary ring 20 and tapered inner wall 70 of retaining ring 22;

(d) sliding tapered inner wall 70 of retaining ring 22 onto mating tapered outer wall 50 of auxiliary ring 20 until tapered inner wall 70 covers both O-ring seals 52A and 52B;

(e) connecting one end of external high pressure feed oil line 106 to internal high pressure feed oil line 78 by attaching screw-in connector 108 to inlet port 90; and connecting the other end of external high pressure feed oil line 106 to source of high pressure oil 107;

(f) activating source of high pressure oil 107 so as to send the high pressure oil through external and internal high pressure feed oil lines 106 and 78 so applying oil at an initial pressure stage through outlet port 96 through groove 54 between the mating, continuous surfaces of tapered outer wall 50 and tapered inner wall 70 between O-ring seals 52A and 52B with sufficient pressure to decrease the diametrical dimensions of tapered outer wall 50 and to increase the diametrical dimensions of tapered inner wall 70;

(g) applying mechanical force to retaining ring 22 in an inward longitudinal direction while simultaneously increasing the pressure on the oil being forced between tapered outer wall 50 and tapered inner wall 70 until retaining ring 22 is fully mounted to auxiliary ring 20, and as a result simultaneously cold press-fitting cylindrical inner wall 46 of auxiliary ring 20 over cylindrical outer wall 29 of rotor end portion 26;

(h) deactivating source of high pressure oil 107 and disconnecting external high pressure feed oil line 106 from internal high pressure feed oil line 78.

The assembly of retaining ring system 10 to rotor 16 can be accomplished alternatively as follows:

(a) rotating auxiliary ring 20 until a key and keyway associated with shoulder wall 32 and inward end wall 40 of auxiliary ring 20 are in alignment so that inlet port 90 of internal high pressure feed oil line 78 in auxiliary ring 20 is in alignment with slot 35 defined at cylindrical outer wall 28 of rotor 16;

(b) sliding cylindrical inner wall 46 of auxiliary ring 20 over cylindrical outer wall 29 of rotor end portion 26 bridging the rotor winding slots until the key and keyway are locked into alignment as as alignment keeper 102 with inward end wall 40 of auxiliary ring 20 being in contact with shoulder wall 32, cylindrical inner wall 46 having a slightly greater diameter than cylindrical outer wall 29;

(c) heating retaining ring 22 so as to expand tapered inner wall 70 sufficiently to increase the diametrical dimensions of tapered inner wall 70;

(d) sliding tapered inner wall 70 of retaining ring 22 over tapered outer wall 50 of auxiliary ring 20 to the extent possible;

(e) applying mechanical force to retaining ring 22 in a longitudinal direction until retaining ring 22 is fully mounted to auxiliary ring 20, and as a result simultaneously cold press-fitting cylindrical inner wall 46 of auxiliary ring 20 over cylindrical outer wall 29 of rotor end portion 26;

(f) ceasing the application of and mechanical force to retaining ring 22.

The disassembly of retaining ring system 10 from rotor 16 is accomplished in accordance with the following steps:

(a) removing plug 104 from inlet port 90;

(b) connecting one end of external high pressure feed oil line 106 to internal high pressure feed oil line 78 by attaching screw-in connector 108 to inlet port 90; and connecting the other end of external high pressure feed oil line 106 to source of high pressure oil 107;

(c) activating source of high pressure oil 107 so as to send the high pressure oil through external and internal high pressure feed oil lines 106 and 78 and so applying oil at an initial pressure stage through outlet port 96 through groove 54 between the mating, continuous surfaces of tapered outer wall 50 and tapered inner wall 70 between O-ring seals 52A and 52B with sufficient pressure to decrease the diametrical dimensions of tapered outer wall 50 and to increase the diametrical dimensions of tapered inner wall 70;

(d) applying mechanical force to retaining ring 22 in an outward longitudinal direction while simultaneously increasing the pressure on the oil between tapered outer wall 50 and tapered inner wall 70 until retaining ring 22 is fully separated from auxiliary ring 20; and (e) removing retaining ring 22 from auxiliary ring 20;

(f) deactivating source of high pressure feed oil 107 and disconnecting external high pressure feed oil line 106 from internal high pressure feed oil line 78; and (g) applying longitudinal pressure to auxiliary ring 20 in an outward direction with sufficient force to separate auxiliary ring 20 from rotor 16; and (h) removing auxiliary ring 20 from rotor 16.

O-ring seals 52a and 52B are operative during both assembly and disassembly procedures. During assembly procedures, they seal off the high pressure areas created by the application of high pressure oil thus causing tapered out wall 50 and tapered inner wall 70 to separate and lose their interference fit. At the same time they aid in increasing the interference between cylindrical outer wall 29 and cylindrical inner wall 46. Retaining ring 22 can then be disengaged from auxiliary ring 20. In a similar process, during disassembly procedures, O-ring seals 52A and 52B also seal off the high pressure areas created by the application of high pressure oil thus causing tapered out wall 50 and tapered inner wall 70 to separate and lose their interference fit. At the same time they aid in increasing the interference between cylindrical outer wall 29 and cylindrical inner wall 46. The process of dismounting retaining ring 22 from auxiliary ring 20 is thus aided by the separation of tapered outer and inner walls 70 when longitudinal mechanical force is simultaneously applied.

Figure 6:
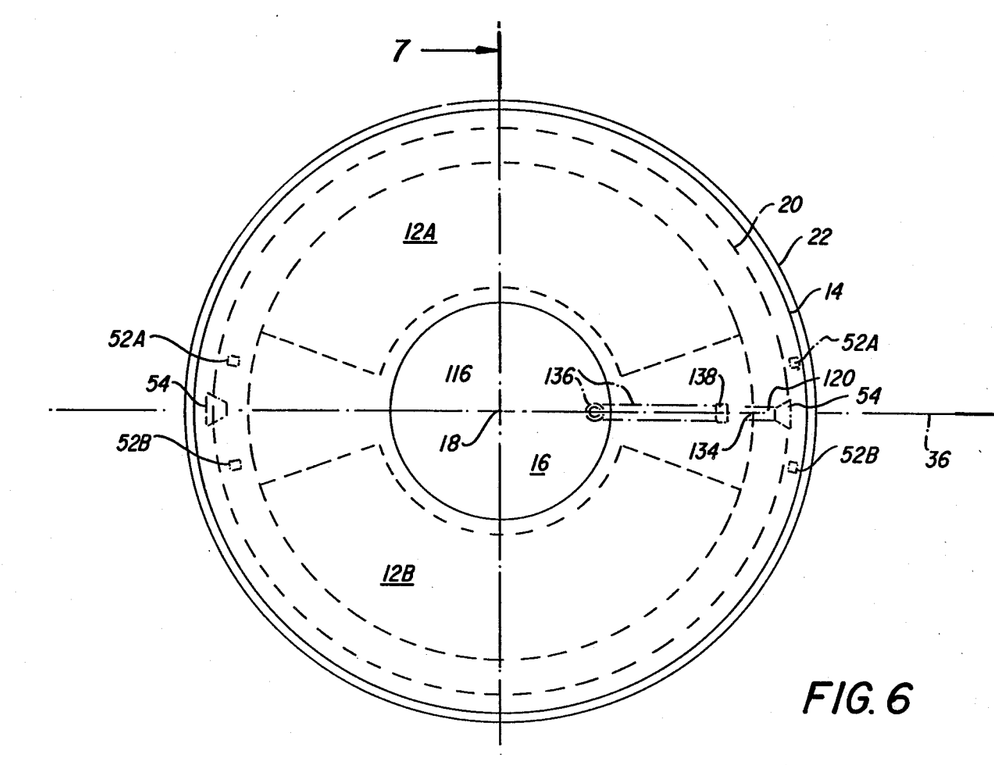
FIG. 6 is a front view of a generator rotor including another embodiment of a retaining ring system.
Figure 8:
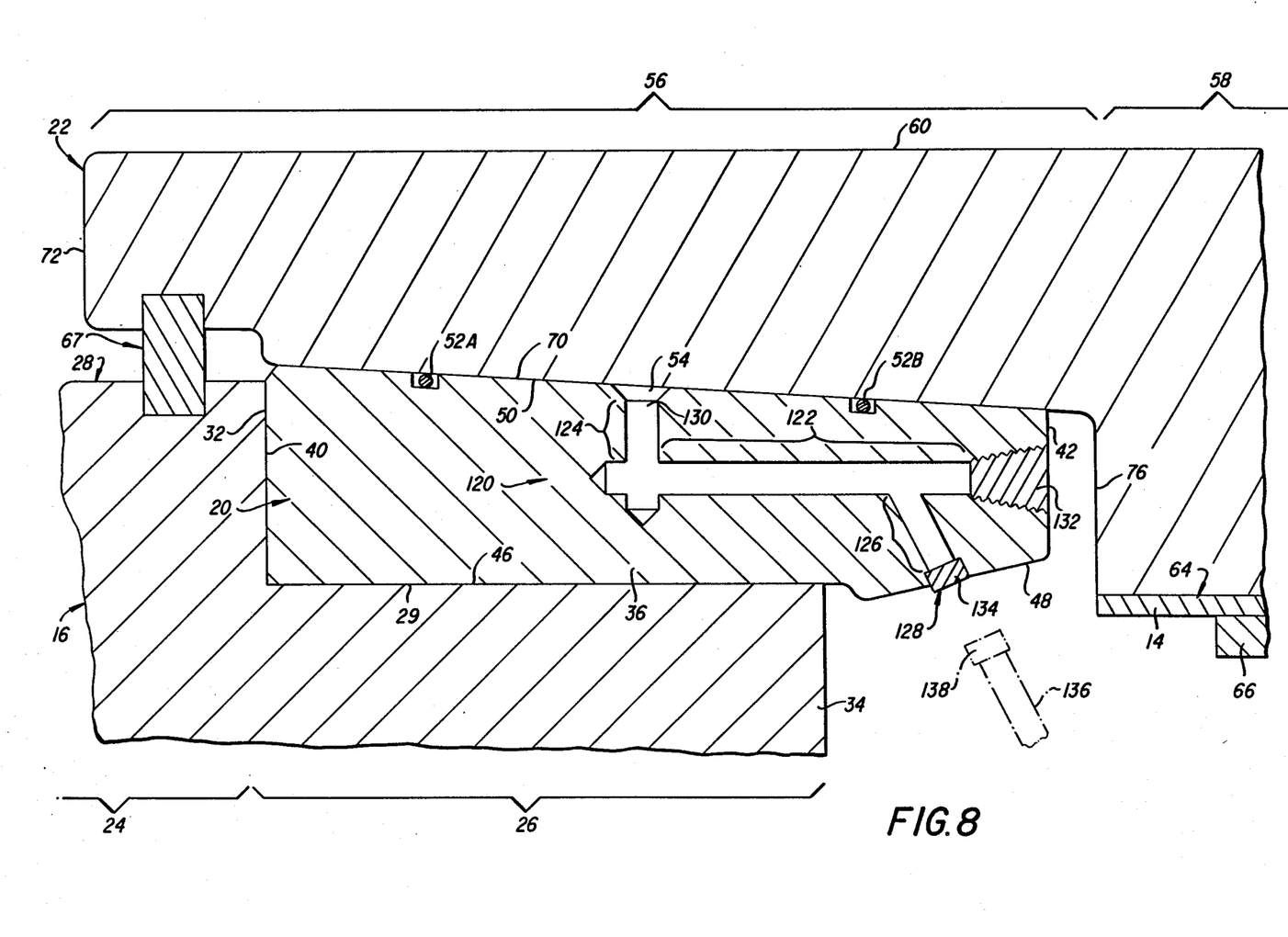

A retaining ring system 118 illustrated in FIGS. 6, 7, and 8 includes auxiliary ring 20 mounted to the outer end portion of rotor 16 and retaining ring 22 mounted around auxiliary ring 20, which in turn supports retaining ring 22 in the same manner as illustrated and described with reference to retaining ring system 10 and FIGS. 1-4.

Retaining ring system 118 includes a high pressure feed oil line 120 located in auxiliary ring 20 in alignment with right space 13 between opposed sets of field end windings 12A and 12B. High pressure feed oil line 120 includes a longitudinal feed line portion 122 tapped through auxiliary ring lateral to rotor axis of rotation 18, a rearward feed line portion 124 tapped through auxiliary ring 20 transverse to rotor axis of rotation 18 joined to the rearward end of longitudinal feed line line portion 122 plugged at outward end wall 42, and an angled forward feed line portion 126 tapped through auxiliary ring 20 joined to and angled forwardly from the forward end of longitudinal feed line portion 122. Feed line portion 126 has an inlet port 128 located at inner wall 48, and transverse feed line portion 124 has an outlet port 130 opening to circumferential groove 54. Feed oil line portions 122, 124, and 126 form a continuous tubular passage between inlet and outlet ports 128 and 130.

A removable sealing plug 134 is screwed into a fitting at the end of high pressure feed oil line 120 at inlet port 128. An external high pressure feed oil line 136 having a screw-in plug 138 adapted to be connected to inlet port 128 of angled feed line portion 126 after the removal of plug 134 at one end and to be connected to a source of high pressure oil 140 at the other end is shown in part in phantom line. Feed oil line portions 122, 124, and 126 define a continual tubular passage between inlet and outlet ports 128 and 130. When plug 134 is removed from inlet port 128, external high-pressure feed oil line 136 having a screw-in connector 138 can then be attached to high pressure feed oil line 120 by screw-in connector 138.

External high pressure feed oil line 136 is inserted at the forward end of retaining ring system 118 through cylindrical holes 116 and 112 lateral to rotor axis of rotation 18 and then outward relative to rotor axis of rotation 18 to inlet port 128.

The assembly of retaining ring system 118 to rotor 16 is accomplished in accordance with the following steps:

(a) sliding cylindrical inner wall 46 of auxiliary ring 20 over cylindrical outer wall 29 of rotor end portion 26 bridging the rotor winding slots until inward end wall 40 of auxiliary ring 20 is in contact with shoulder wall 32, cylindrical inner wall 46 having a slightly greater diameter than cylindrical outer wall;

(b) applying oil to the interfacing surfaces of tapered outer wall 50 of auxiliary ring 20 and tapered inner wall 70 of retaining ring 22;

(c). sliding tapered inner wall 70 of retaining ring 22 onto mating tapered outer wall 50 of auxiliary ring 20 until tapered inner wall 70 covers both O-ring seals 52A and 52B;

(d) connecting one end of external high pressure feed oil line 136 to internal high pressure feed oil line 120 by attaching screw-in connector 138 to inlet port 128; and connecting the other end of external high pressure feed oil line 136 to source of high pressure oil 140;

(e) activating source of high pressure oil 140 so as to send the high pressure oil through external and internal high pressure feed oil lines 136 and 120 to outlet port 130 and groove 54 and so applying high pressure oil between mating, continuous surfaces of tapered outer wall 50 and tapered inner wall 70 between O-ring seals 52A and 52B with sufficient pressure to decrease the diametrical dimensions of tapered outer wall 50 and increase the diametrical dimensions of tapered inner wall 70;

(f) applying mechanical force to retaining ring 22 in an inward longitudinal direction while simultaneously increasing the pressure on the oil being forced between tapered outer wall 50 and tapered inner wall 70 until retaining ring 22 is fully mounted to auxiliary ring 20; and (g) deactivating source of high pressure oil 140 and disconnecting external high pressure feed oil line 136 from internal high pressure feed oil line 120.

The heating assembly of retaining ring system 118 to rotor 16 is accomplished by the heating method described previously in regard to retaining ring system 10.

The cold disassembly of retaining ring system 118 from rotor 16 is accomplished in accordance with the following steps:

(a) removing plug 134 from inlet port 128;

(b) connecting one end of external high pressure feed oil line 136 to internal high pressure feed oil line 120 by attaching screw-in connector 138 to inlet port 128; and connecting the other end of external high pressure feed oil line 136 to source of high pressure oil 140;

(c) activating source of high pressure feed oil 140 so as to send the high pressure oil through external and internal high pressure feed oil lines 136 and 120 and so applying oil at an initial pressure stage through outlet port 130 into groove 54 between the mating, continuous surfaces of tapered outer wall 50 and tapered inner wall 70 between O-ring seals 52A and 52B with sufficient pressure to decrease the diametrical dimensions of tapered outer wall 50 and to increase the diametrical dimensions of tapered inner wall 70;

(d).applying mechanical force to retaining ring 22 in an outward longitudinal direction while simultaneously increasing the pressure on the oil between tapered outer wall 50 and tapered inner wall 70 until retaining ring 22 is fully separated from auxiliary ring 20;

(e) removing retaining ring 22 from auxiliary ring 20;

(f) deactivating source of high pressure feed oil 140 and disconnecting external high pressure feed oil line 136 from internal high pressure feed oil line 120;

(g) applying longitudinal force to auxiliary ring 20 in an outward direction sufficiently to separate auxiliary ring 20 from rotor 16; and (h) removing auxiliary ring 20 from rotor 16.

Inasmuch as the final assembly of retaining ring 22 will induce a high interference at the inner diameter of auxiliary ring 20, auxiliary ring 20 need have only a very small interference with rotor 16 and therefore optionally could easily be slipped onto rotor 16 with a small amount of heating at such a temperature that would not cause any change either to field windings 31 or to auxiliary ring 20 itself. Such an optional small amount of heating would substantially devoid of heat that it would fall within the spirit of the invention as mounting devoid of heat.

The high pressure oil described herein can be any high pressure fluid, and high pressure feed oil lines 78 and 120 can be any high pressure feed fluid lines adapted to pass such high pressure fluid.

Although the present invention has been described in some detail by way of illustration and example for purposes of clarity and understanding, it will, of course, be understood that various changes and modifications may be made in the form, details, and arrangements of the parts without departing from the scope of the invention set forth in the following claims. For example, although the embodiments of the invention described and illustrated herein are mounted to the rotors of generators by way of exposition, the invention can be applied generally to other rotating electrical devices, such as motors and condensers.

What is claimed is:

1. A retaining ring system for supporting the field end windings of a rotating electrical device, comprising, in combination, first ring means adapted to be removably mounted by means devoid of the application of heat to the end portion of the rotor of the rotating electrical device and bridging rotor winding slots, the rotor having an axis of rotation, said first ring means being axially aligned with said axis of rotation, second ring means axially aligned with said first ring means removably around said first ring means, said second ring means being for supporting the field end windings and the amortisseur windings of the rotating electrical device, said first ring means being for supporting said second ring means and for connecting said second ring means to the rotor, first taper means defined by said first ring means, and second taper means defined by said second ring means, said first and second taper means being for providing continuous mating first and second tapered surfaces, respectively, between said first and second rings, said first and second ring means being removably mounted at said first and second taper means, high pressure feed fluid line means associated with said first ring means having an inlet port and having an outlet port opening at said mating first and second tapered surfaces, said inlet port being adapted to be connected to a source of high pressure fluid, sealing means positioned between said first and second tapered surfaces for containing said high pressure fluid, whereby when said inlet port is connected to said source of high pressure fluid which is thereupon activated and said high pressure fluid passes to said mating first and second mating surfaces within said sealing means with sufficient pressure to increase the outer diameter of said first ring means and the inner diameter of said second ring means at said second taper means and thus to separate said first and second taper means so as to allow either assembly or disassembly of said second ring means to or from said first ring means devoid of the application of heat.

2. The retaining ring system according to claim 1, further including groove means extending circumferentially around said first ring means at said first and second taper means, said outlet port opening at said groove means, said groove means being for distributing said high pressure oil during assembly or disassembly.

3. The retaining ring system according to claim 2, wherein said groove means is a circumferential groove defined by said first ring means at said first tapered surface.

4. The retaining ring system according to claim 1, wherein the rotor includes a rotor main portion and a rotor end portion, said rotor end portion defining a rotor end portion cylindrical outer wall and having a rotor end wall generally transverse to the axis of rotation; and said first ring means includes a first ring defining a first ring cylindrical inner wall mounted to said rotor end portion outer cylindrical wall.

5. The retaining ring system according to claim 4, wherein said rotor main portion defines a rotor main portion cylindrical outer wall having a diameter greater than said rotor end portion cylindrical outer wall, said rotor having a shoulder wall formed between said rotor main portion and said rotor end portion extending in radial alignment with the axis of rotation, said first ring having first ring inward and outward end walls relative to said rotor end wall and to the axis of rotation in the longitudinal dimension, said first ring inward wall being adjacent to said shoulder wall.

6. The retaining ring system according to claim 5, wherein said first ring includes first ring inward and outward portions relative to the rotor end wall and to the axis of rotation in the longitudinal dimension, said first ring inward portion including said first ring cylindrical inner wall and said first ring inward end, said first ring outward portion extending beyond said rotor end wall, said first ring outward portion having a first ring outward portion inner wall extending around the axis of rotation.

7. The retaining ring system according to claim 5, wherein said first ring further includes a first ring tapered outer wall, said first tapered surface of said first taper means being said first ring tapered outer wall, said first ring tapered outer wall decreasing in diameter relative to the axis of rotation in the longitudinal dimension between said first ring inward end toward said first ring outward end.

8. The retaining ring system according to claim 7, wherein said second ring means includes a retaining ring having retaining ring inward and outward sections and retaining ring inward and outward ends relative to the rotor end wall and to the axis of rotation in the longitudinal dimension, said retaining ring inward section defining a retaining ring inner tapered wall, said second taper means being said retaining ring inner tapered wall, said retaining ring tapered inner wall decreasing in diameter relative to the axis of rotation in the longitudinal dimension between said retaining ring inward end toward said retaining ring outward end, said first ring outer tapered wall and said retaining ring inner tapered wall being in continuous mating contact and in mechanical, cold press-fitted engagement.

9. The retaining ring system according to claim 8, wherein said high pressure feed fluid line means includes a high pressure feed fluid passage defined by said first ring and including said inlet port and said outlet port.

10. The retaining ring system according to claim 9, wherein said rotor defines a slot at said rotor main portion cylindrical outer wall having a slot aperture at said shoulder wall, said inlet port being located at said slot aperture.

11. The retaining ring system according to claim 5, wherein said high pressure feed fluid line includes a high pressure feed fluid passage defined by said first ring, said inlet port being located at said first ring outward portion inner wall.

12. The retaining ring system according to claim 11, said retaining ring defining a retaining ring hole longitudinal relative to the axis of rotation, said retaining ring hole including an outward cylindrical hole defined by said outward section, said inward section including said second taper means defining an inward tapered hole, said retaining ring having retaining ring inward and outward end walls relative to said rotor end wall in the longitudinal dimension; said retaining ring outward section including a retaining ring inner cylindrical wall, and further including a centering ring mounted to said retaining ring cylindrical inner wall at said retaining ring outward end wall, said centering ring defining a centering ring hole coextensive with said retaining ring outward end wall, and further including an external high pressure feed fluid line adapted to be connected to said source of high pressure fluid and to said inlet port, said external high pressure feed fluid line being adapted to extend between said source of high pressure fluid and said inlet port through said centering ring hole and said retaining ring hole to said inlet port.

13. The retaining ring system according to claim 12 wherein the field end windings are supported by said retaining ring cylindrical inner wall.

14. The retaining ring system according to claim 12, further including amortisseur windings supported by said retaining ring cylindrical inner wall.

15. The retaining ring system according to claim 1, wherein said fluid is a liquid.

16. The retaining ring system according to claim 1, wherein said fluid is an oil.

17. The retaining ring system according to claim 1, wherein said fluid is a grease.

18. A retaining ring system for supporting the field end windings of a rotating electrical device, comprising, in combination, first ring means adapted to be removably mounted by means devoid of the application of heat to the end portion of the rotor of the rotating electrical device and bridging rotor winding slots, the rotor having an axis of rotation, said first ring means being axially aligned with said axis of rotation, second ring means axially aligned with said first ring means removably heat-shrunk around said first ring means, said second ring means being for supporting the field end windings and the amortisseur windings of the rotating electrical device, said first ring means being for supporting said second ring means and for connecting said second ring means to the rotor, first taper means defined by said first ring means, and second taper means defined by said second ring means, said first and second taper means being for providing continuous mating first and second tapered surfaces, respectively, between said first and second rings, said first and second ring means being removably mounted at said first and second taper means, high pressure feed fluid line means associated with said first ring means having an inlet port and having an outlet port opening at said mating first and second tapered surfaces, said inlet port being adapted to be connected to a source of high pressure fluid, sealing means positioned between said first and second tapered surfaces for containing said high pressure fluid, whereby when said inlet port is connected to said source of high pressure fluid which is thereupon activated and said high pressure fluid passes to said mating first and second mating surfaces within said sealing means with sufficient pressure to increase the outer diameter of said first ring means and the inner diameter of said second ring means at said second taper means and thus to separate said first and second taper means so as to allow disassembly of said second ring means from said first ring means devoid of the application of heat.

19. The retaining ring system according to claim 2, further including groove means associated with said first and second taper means extending circumferentially around said first and second ring means at said first and second taper means, said outlet port opening at said groove means.

20. A retaining ring system for supporting the field end windings of a rotating electrical device, comprising, in combination, first ring means adapted to be removably mounted by means substantially devoid of the application of heat to the end portion of the rotor of the rotating electrical device and bridging rotor winding slots, the rotor having an axis of rotation, said first ring means being axially aligned with said axis of rotation, second ring means axially aligned with said first ring means removably around said first ring means, said second ring means being for supporting the field end windings and the amortisseur windings of the rotating electrical device, said first ring means being for supporting said second ring means and for connecting said second ring means to the rotor, first taper means defined by said first ring means, and second taper means defined by said second ring means, said first and second taper means being for providing continuous mating first and second tapered surfaces, respectively, between said first and second rings, said first and second ring means being removably mounted at said first and second taper means, high pressure feed fluid line means associated with said first ring means having an inlet port and having an outlet port opening at said mating first and second tapered surfaces, said inlet port being adapted to be connected to a source of high pressure fluid, sealing means positioned between said first and second tapered surfaces for containing said high pressure fluid, whereby when said inlet port is connected to said source of high pressure fluid which is thereupon activated and said high pressure fluid passes to said mating first and second mating surfaces within said sealing means with sufficient pressure to increase the outer diameter of said first ring means and the inner diameter of said second ring means at said second taper means and thus to separate said first and second taper means so as to allow either assembly or disassembly of said second ring means to or from said first ring means devoid of the application of heat.

* * * * *